(12) United States Patent
Pérez Hinojosa

(10) Patent No.: US 8,211,961 B1
(45) Date of Patent: Jul. 3, 2012

(54) PROCEDURE FOR PREPARATION OF A THERMAL INSULATION AND WATERPROOF COATING

(76) Inventor: Ulises Eladio Pérez Hinojosa, Nuevo León (MX)

( * ) Notice: Subject to any disclaimer, the term of this patent is extended or adjusted under 35 U.S.C. 154(b) by 0 days.

(21) Appl. No.: 13/180,246

(22) Filed: Jul. 11, 2011

(51) Int. Cl.
*C08K 5/00* (2006.01)
*C08L 31/00* (2006.01)

(52) U.S. Cl. .......................................... 524/83; 524/556

(58) Field of Classification Search .................. 524/83
See application file for complete search history.

(56) References Cited

U.S. PATENT DOCUMENTS

2010/0152366 A1* 6/2010 Perez-Hinojosa ............ 524/556
* cited by examiner

*Primary Examiner* — Ling Choi
*Assistant Examiner* — Hui Chin
(74) *Attorney, Agent, or Firm* — Defillo & Associates, Inc.; Evelyn A. Defillo

(57) ABSTRACT

The present invention refers to a procedure for preparation of a thermal insulation and waterproof coating, as well as its composition, obtained by combination of some components and the preparation of spherical particles internally dismembered highly flexible, attenuated in water, flexible branched chain polymer modified with acrylic, in a titanium dioxide presence. With these elements and its balance is obtained a product high grade of adhesion over several substrates not requiring previous sealing with high properties when used as waterproof coating. Likewise, it differ of traditional coatings, the internally dismembered particles, which contain a % of humidity, are appropriate for the formation of links and connections necessaries for the formation of a monolithic flexible film to make an waterproof coating application in one step, moreover getting a coating with thermal insulation properties, highly flexible and low specific weight (low density).

5 Claims, No Drawings

PROCEDURE FOR PREPARATION OF A THERMAL INSULATION AND WATERPROOF COATING

FIELD OF THE INVENTION

The present invention refers a procedure for preparation of a thermal insulation and waterproof coating, and its composition, that for its components and physical and chemical characteristics, is easy to apply, durable, and with excellent insulation properties.

BACKGROUND OF THE INVENTION

At present in the state of art related to thermal insulation and waterproof coatings with a similar composition as the obtained by the process described in this patent, based on polymeric components with calcium carbonate, titanium dioxide and cellulose, are divulged in different patent documents such as: CN1632009A, CN101041758A, CN101130457A, CN101691467A, FR2935698A1, JP2007291229A, U.S. Pat. No. 3,973,074 y U.S. Pat. No. 4,277,355. Even though all these documents are related with thermal insulation and waterproof coatings, they have not the properties of the present invention. On the other hand, the advantages of this process and the resulting composition that is detailed in this document, it will be understandable for a person with middle knowledge in the art, based on the next description in a preferred embodiment of the invention.

The acrylic waterproof coatings are used since its creation under the scheme of a system with process variables on its application. On these types of system it can observe important possibilities of failures, like: to adhere incorrectly the net (membrane), to no cover or seal the cracks correctly with plastic cement.

Nowadays the thermal insulation are used to obtain insulation based on thickness or volume, that in most cases have to be protected from solar rays, water and the environment in order to not suffer damages or lose their properties.

Unlike the acrylic waterproof coatings, the thermal insulation and waterproof coating of the present invention is designed to get a total protection in one step, eliminating previous steps concerning the application. This is achieved by containing particles, internally dismembered, highly flexible on the periphery that allows the obtaining of films with thickness from 1.2 to 1.5 mm. in one step, when in the traditional system is not possible to obtain this thickness even with the double application specified in the instructions and the reinforcement net.

DETAILED DESCRIPTION

The present invention refers a process for the preparation of thermal coating, as well as, its composition, where it observes the effect to stay in contact at temperature (from 10° C.) in a mixture relation, internally dismembered particles with 15% of controlled humidity, adding acrylic flexible polymers of branched chain, in the presence of highly hard water without previous treatment.

The present invention also refers to a process for the preparation a thermal insulation and waterproof coating, in whose product present a flexible and low specific weight properties, that is obtained by the mixture of acrylic polymer with other substances and compositions, in controlled conditions of temperature preferred from 25° to 30° C.

For the preparation of the a thermal insulation and waterproof coating requires the preparation of spherical particles internally dismembered highly flexible, attenuated with water, branched chain polymer modified with acrylic, in presence of titanium dioxide. With these elements is obtained a product with high grade of adherence over many substrates not requiring previous sealed with high properties when is used as waterproof coating. The internally dismembered particles, containing a percent of humidity, are appropriate for the connections and links required for the formation of a monolithic flexible film to apply the waterproof coating in one step.

In hard water is added various additives and hygroscopic particles until it reaches saturation, viscosity and fluidity levels are regulated, with acrylics modified using a buffer if necessary, add internally dismembered particles presenting a slightly endothermic reaction.

Basically, the process for the preparation of the thermal insulation and waterproof coating follows next steps:

Pour deionized water in a container

Add and mix isothiazolone (Kathon®)

Add and mix antifoam (NDW®)

Shake the solution, then add and mix polyelectrolyte of carboxylate salt (Orotan®) and continue mixing constantly while addition is taking place.

Add and mix 2-ethyl-hexane (C-009 WET 40 D®), then add and mix monoethylene glycol (Fortequim®) at constant temperature and ambient temperature.

Add and mix sodium hexametaphosphate (Mardupol®) solution at 20%

Add and mix styrene acrylic resin (Wyn®)

Add and mix titanium dioxide R-902 (DuPont®)

Add and mix monoethylene glycol (Fortequim®)

Add and mix constantly, laminated calcium carbonate (Qualymin®)

Add and mix hydroxy methyl cellulose (Cellosize QPS 52000®)

Add and mix to the mixture dioctyl phthalate (DOP)

Add and mix texanol plastifier (Fortequim®)

Add and mix a buffer of ammonium hydroxide (Mardupol®) at 28%

Add and mix acrylic thickener (Wyn®)

Add and Nafta Gas (Fortequim®)

Kept the solution in repose for 5 minutes

Mix and keep adding with shaking the styrene acrylic resin (Wyn®)

The addition and mixture of components are made under stirring of 1200 rpm.

During all the process the pH has to be controlled in a range from 7.5 to 9.2, viscosity likewise, which interval has to be among 30,000 to 50,000 cps (centipoise).

The finished product prepared by this process has a dense non fluid, presents a K factor (thermal conductivity) of 0.39 W/m K, an emissivity from 0.8 to 23° C., pH between 7.0 y 9.0, viscosity from 40,000 to 85,000 cps, an apparent density of 515.16 Kg/m$^3$, steam water permeability of 0.00921 ng/Pa s m and an humidity adsorption of % mass of 0.065 and % volume of 0.031.

The final mixture, preferred obtained by the process just mentioned, expands, for that reason, a mixture for example of 171.26 Kg of weight come to occupy a volume up to 247 L at the ending of mixing components. According to the process a preferred mixture has the next composition (table 1):

TABLE 1

Components of the thermal insulation and waterproof coating obtained in the present invention.

| | COMPONENT | Kg | % Weight |
|---|---|---|---|
| 1 | WATER | 85.700 | 50.0175 |
| 2 | SODIUM HEXAMETAPHOSPHATE | 0.150 | 0.0875 |
| 3 | KATHON LX 1.5% | 0.040 | 0.0233 |
| 4 | OROTAN | 0.320 | 0.1867 |
| 5 | THICKENER - NDW | 3.550 | 2.0719 |
| 6 | MONOETHYLENE GLYCOL | 0.150 | 0.0875 |
| 7 | TITANIUM DIOXIDE | 2.500 | 1.4590 |
| 8 | CALCIUM CARBONATE | 30.000 | 17.5090 |
| 9 | Styrene acrylic resin - WYN | 30.000 | 17.5090 |
| 10 | DIOCTYL PHTALATE DOP | 2.500 | 1.45908 |
| 11 | TEXANOL | 0.190 | 0.1108 |
| 12 | AMMONIUM HYDROXIDE | 2.500 | 1.4590 |
| 13 | ACRYLIC THICKENER - WYN | 1.570 | 0.9163 |
| 14 | C-009 WET 40D | 10 | 5.8363 |
| 15 | CELLOSIZE | 0.67 | 0.3910 |
| 16 | NAFTA GAS | 1.500 | 0.8754 |

These components were selected according chemical properties and purity, suppliers and trade names deployed in following list (table 2):

TABLE 2

Component list according trade name, related to the thermal insulation and waterproof coating obtained by the process of the present invention.

| TRADE NAME | MANUFACTURER | USE | SPECIFICATIONS |
|---|---|---|---|
| KATHON LX 1.5% | ROHMHAAS | BIOCIDE | Colour Gardner (vcs): 0-4, pH: 2.0-4.0, copper nitrate II: 0.15-0.17% magnesium nitrate: 0.0-3.0% |
| OROTAN 731-A | ROHMHAAS | DISPERSANT | Colour APHA/HAZEN PT-CO: 0.0-250.0, specific gravity: 1.078-1.114, pH diluted: 10.2-10.6, solids: 24-26%. viscosity brookfield: 20.0-130.0 cps |
| AMMONIUM HYDROXIDE | MARDUPOL | BUFFER | Relative density 15° C.: 0.89-0.90 g/cm$^3$, Concentration: 28% minimum |
| NDW | ROHMHAAS | ANTIFOAM | Humid: 1% (max.). pH direct: 5.0-6.5, pH al 2% in water: 6.0-7.0, active ingredient: 99%, water solubility dispersible, specific weight at 20° C.: 0.83-0.85 g/ml |
| CALCIUM CARBONATE | QUALYMIN | FILLER | Dry Whitness: 91.50 (min), Retained in net-325: 1.0 (min), Oil Absorption: 20.00-23.00, Humid: 1.0% (min) |
| C-009 WET 40D | PROINSA | LIGHTEN | Average humidity content: 85%, presentation: box of 160 kg |
| SODIUM HEXAMETAPHOSPHATE | MARDUPOL | HUMECTANT | Ignition loss: 0 50% (max.), Insoluble substances: 010% (max.), Purity (as $P_2O_5$): 67.0% (min.). pH (solution 1%): 6.5-7.1, Physical aspect: odorless White powder, impurities free |
| MONOETHYLENE GLYCOL | FORTEQUIM | ANTIFREEZE | Density at 25° C.: 1.110 (+/−0.005) Kg/L, purity by chromatography of gas: 99% (min), Distillation range: 186-198° C., solubility: complete Humidity by Karl Fisher: 0 50% (max.) |
| TEXANOL | FORTEQUIM | PLASTIFIER | Density at 25° C.: 0.945 (+/−0.010) Kg/L, by chromatography of gas: 99% (min), distillation range: 235-255° C., |
| NAFTA GAS | FORTEQUIM | THINNER | Density at 25° C.: 0.775-0.785 Kg/L, by chromatography of gas: 98% (min), distillation range: 155-200° C., Solubility: insoluble |
| ACRYLIC THICKENER | WYN OF MÉXICO | THICKENER | Solids: 29.0-31.0%, pH at 25° C.: 2.5-3.5, Viscosity brookfield: 100 cps (max.). presentación |
| CELLOSIZE QPS 52000 | MEXICAN CORPORATION OF POLYMERS | CELLULOSE | Viscosity brookfield: 2,400-3,000 cps. insoluble in water (aqueous solution at 1%): 0 0-1.0% in weight volatility (aqueous solution at 1%): 0.0-5.0% in weight, hydration time (aqueous solution at 1%): 5.0-15.0% in weight |
| TITANIUM DIOXIDE R-902 | DUPONT | PIGMENT | Colour L: 99.20 (min.), Colour A: −0.9 a −0.3, Tonality relative B: 1.60-2.80, Black smoke undertone: 100-140, Fineness Hegman: 7.00 (min.), Final count of particles: 4 00 (min.), Particles countings Scats: 150 (max.) brightness |

TABLE 2-continued

Component list according trade name, related to the thermal insulation and waterproof coating obtained by the process of the present invention.

| TRADE NAME | MANUFACTURER | USE | SPECIFICATIONS |
| --- | --- | --- | --- |
| Styrene acrylic resin | WYN OF MÉXICO | ADHERENT BINDER | (20 grades): 60 (min.), Oil Absorption: 13.0-20.0, pH: 7.3-9.5, Resistance 30° C.: 4.0 (min.) physical aspect: white powder, thin Solids: 49.0-51.0%, Viscosity: 10,000-20, 000 cps, pH at 25° C.: 4.0-5.0 |

Should be emphasize that based on diverse trial and error tests, making variations in aggregate and sequencing of components, as well as prime materials changes, is obtained a monolithic, solid and flexible coating, as a result of the granulometric modifications of the particles which gives to the product thermal insulation and waterproof functions.

The advantages of the thermal insulation and waterproof coating of the present invention were proved trough field evaluations and diverse laboratory test:

Field evaluation 1: under thickness (1.0 al.5 mm) is obtained thermal insulation properties, compared with other thermal insulation that requires more volume or thickness. There are documented studies of applications in housing achieving better results of comfort against polyurethane systems and also against polystyrene of 1 inch thickness.

Field evaluation 2: once dry, the coating not requires any additional protection against solar rays, water or the environment, differ to the traditional thermal insulation coatings that requires an acrylic cover, aluminum layers among other products to protect the thermal insulation from solar rays, water and environment.

Field evaluation 3: it takes adhesion tests over several substrates such as concrete, metallic surfaces, Wood, among others with favorable results.

To support these field evaluations, some laboratory tests were taken to the waterproof coating obtained by the process of the present invention, tests were:

Thermal Conductivity test applied to the coating with thermal insulation properties, as well as flexible properties and low specific weight. These tests were compared with others thermal insulation coatings with same thickness and volume. The results of this coating about thermal insulation properties, as well as flexible properties and with low specific weight, were better in comfort terms in those areas where the coating were applied than others conventional thermal insulation coatings like polyurethane and polystyrene.

The conductivity test to determine the R factor (thermal resistance) and K factor (Thermal conductivity factor) were performed in Research Center for Applied Chemistry (CIQA-Centro de Investigación Quimica Aplicada) of CONACYT, and for EMA Labs, an IDESA company, based on standards NOM C-189, equivalent to ASTM C518, which is applied to insulating materials, for that reason is measured the thermal transfer with a hot plate isolated, being the average thermal conductivity of 0.0610296 Kcal/h m ° C. at 40.7° C. and 0.0656131 Kcal/h m ° C. at 54.12° C. accelerated intemperism test were performed with favorable results in a accelerated intemperism test chamber QUV (at 150, 300 y 600 hrs), simulating photodegradation by ultraviolet light (4 hours of ultraviolet light with a 313 nm. Radiation lamp, an average temperature of 60° C.), for rain effect (10 min. Of water spray, decreasing drastically the temperature to 25° C.), for hot humidity of condensation (3 hours 50 min. of condensation an average temperature of 40° C.), for rigorous humidity, as well as the thermal shock and erosion. These tests were performed by technical services of Wyn Mexico.

On the laboratory test that proves the efficiency of the waterproof coating of this invention, were obtained films with a thickness of 1.2 a 15 mm. in one step, drying fast on the periphery of the external film, which avoids and reduces problems of wear of the product in a presence of rain or humidity, furthermore present an excellent grade of adhesion over many surfaces. After drying the films creates a light cushioning (shock absorber) with low humidity retention, which avoids the adherence of dust and strange particles, helping to maintain clean the tone of the coating.

On the other hand, through laboratory qualitative tests proves that the coating obtained forms an excellent film resistant to intemperism, to humidity and temperature changes after application (with drying checked).

The proving test of resistant at intemperism and the humidity of the waterproof coating consisted on breezing application (moderate rain) over the film in periods of 30 to 40 minutes without wear, damages or decomposition in itself. There were made test over areas covered by the coating, which consist in pour water accumulated on it for 20 days, observing neither signs of wear on films, nor filtration of water.

Other test to prove the thermal resistant of the waterproof coating consist in putting ice 3 consecutive days over films, as well as film exposure to temperatures under 0° C. for more than 72 hours maintaining its flexibility and physical properties.

Proving the physical resistance to wear we observe a better traffic support in a higher grade than common elastomeric waterproof coatings, as well as the resistance of a deep cleaning with a fiber brush (ixtle brush).

In general, the mentioned tests proves that films of waterproof coating in question, do not show any damage among common factors that cause wear on commercial waterproof coatings.

Additionally, we have certifications of National Organism of Standardization and Certification of Construction and Edification (ONNCCE-Organismo Nacional de Normalización y Certificación de la Construcción y Edificación) and Trust for saving Electric Energy (FIDE-fideicomiso para el ahorro de energía eléctrica) in where guarantee the properties of the product and the results obtained when used in buildings. The test applied at this coating is Official Mexican Standard NOM-018-ENER-1997, related to thermal insulation coatings for buildings.

Even when the present invention has been described respect some preferred embodiments, it is obvious that alterations and equivalent modifications can be proposed by skilled person in the field, after reading and understanding the description, therefore is understood that this invention is not limited to that was illustrated in the figures, but the scope of the claims.

What is claimed is:

1. A process for preparation of a thermal insulation and waterproof coating comprising next steps:
   a) pouring deionized water in a container;
   b) mixing the deionized water with isothiazolone;
   c) adding antifoam;
   d) shaking and continuously mixing with polyelectrolyte of carboxylate salt;
   e) adding and mixing 2-ethyl-hexane and then adding and mixing monoethylene glycol at ambient temperature;
   f) adding and mixing sodium hexametaphosphate solution at 20%;
   g) adding and mixing styrene acrylic resin;
   h) adding and mixing titanium dioxide;
   i) adding and mixing monoethylene glycol;
   j) adding and mixing laminated calcium carbonate;
   k) adding and mixing hydroxy methyl cellulose;
   l) adding and mixing dioctyl phthalate (DOP);
   m) adding and mixing a plastifier;
   n) adding and mixing a buffer of ammonium hydroxide at 28%;
   o) adding and mixing acrylic thickener;
   p) adding and mixing a thinner;
   q) reposing the mixture for 5 minutes; and
   r) mixing and shaking the mixture of step q) while adding styrene acrylic resin, wherein the thermal insulation and waterproof coating has a viscosity between 30,000 to 50,000 centipoise.

2. The process according to claim 1, further including continuously shaking the mixture at 1200 rpm during the entire process.

3. The process according to claim 1, further including continuously controlling the pH of the mixture between 7.5 to 9.2 during the entire process.

4. A composition of thermal insulation and waterproof coating obtained by the procedure of claim 1 comprising in weight percent:

| | | |
|---|---|---|
| a) | water | 50.0175% |
| b) | sodium hexametaphosphate | 0.0875% |
| c) | Isothiazolone 1.5% | 0.0233% |
| d) | polyelectrolyte of carboxylate salt | 0.1867% |
| e) | Thickener | 2.0719% |
| f) | monoethylene glycol | 0.0875% |
| g) | titanium dioxide | 1.4590% |
| h) | calcium carbonate | 17.5090% |
| i) | styrene acrylic resin | 17.5090% |
| j) | dioctyl phthalate | 1.45908% |
| k) | plastifier | 0.1108% |
| l) | ammonium hydroxide | 1.4590% |
| m) | acrylic thickener | 0.9163% |
| n) | 2-ethyl-hexane | 5.8363% |
| o) | hydroxy methyl cellulose | 0.3910% |
| p) | thinner | 0.8754%. |

5. The composition of claim 4, wherein the composition has a dense non-fluid consistency, wherein the composition has a thermal conductivity factor (K) of 0.39 W/m K, an emissivity from 0.8 to 23° C., pH between 7.0 and 9.0, viscosity from 40,000 to 85,000 cps, an apparent density of 515.16 Kg/m$^3$, steam water permeability of 0.00921 ng/Pa s m, a humidity adsorption of % mass of 0.065, and % volume of 0.031.

* * * * *